United States Patent
Toyoda et al.

(10) Patent No.: US 6,615,668 B2
(45) Date of Patent: Sep. 9, 2003

(54) SEMICONDUCTOR PRESSURE SENSOR HAVING SIGNAL PROCESSOR CIRCUIT

(75) Inventors: Inao Toyoda, Okazaki (JP); Yasutoshi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/920,831

(22) Filed: Aug. 3, 2001

(65) Prior Publication Data

US 2002/0050172 A1 May 2, 2002

(30) Foreign Application Priority Data

Oct. 27, 2000 (JP) ........................................ 2000-328971

(51) Int. Cl.⁷ ............................................... G01L 9/04
(52) U.S. Cl. .............................. 73/720; 73/715; 73/717
(58) Field of Search ........................... 73/720, 727, 708, 73/754, 718, 715, 717, 726; 257/254, 417, 419

(56) References Cited

U.S. PATENT DOCUMENTS

| | | | |
|---|---|---|---|
| 4,986,127 A | | 1/1991 | Shimada et al. |
| 5,289,721 A | | 3/1994 | Tanizawa et al. |
| 5,408,885 A | | 4/1995 | Araki |
| 5,761,957 A | * | 6/1998 | Oba et al. ...................... 73/727 |
| 5,770,883 A | * | 6/1998 | Mizuno et al. ............. 257/417 |
| 6,184,561 B1 | * | 2/2001 | Tanaka et al. .............. 257/417 |
| 6,218,717 B1 | * | 4/2001 | Toyoda et al. .............. 257/419 |
| 6,357,299 B1 | * | 3/2002 | Aigner et al. ................. 73/754 |
| 6,388,279 B1 | * | 5/2002 | Sakai et al. ................. 257/254 |

FOREIGN PATENT DOCUMENTS

| | | |
|---|---|---|
| JP | A-62-266875 | 11/1987 |
| JP | A-64-76755 | 3/1989 |
| JP | A-1-264254 | 10/1989 |
| JP | A-3-284871 | 12/1991 |
| JP | A-4-103177 | 4/1992 |
| JP | A-7-326771 | 12/1995 |
| JP | A-8-64693 | 3/1996 |
| JP | B2-2650455 | 5/1997 |

OTHER PUBLICATIONS

Ding et al., "DSP–Based CMOS Monolithic Pressure Sensor for High Volume Manufacturing," *Transducers*, Jun. 7–10, 1999, Sendai, Japan, pp. 362–365 (Discussed on p. 1 of the spec.).

*Semiconductor Device—Basic Theory and Process Technology*, Sangyo–Tosho, Tokyo, May 25, 1987, p. 205 (Discussed on p. 2 of the spec.).

A.S. Grove, *Semiconductor Device Basics*, McGlaw–Hill, Mar., 1986, pp. 382–383 (Discussed on p. 9 of the spec.).

U.S. patent application Ser. No. 09/492,605, Tanizawa et al., filed Jan. 27, 2000.

* cited by examiner

*Primary Examiner*—Andrew H. Hirshfeld
*Assistant Examiner*—Marissa Ferguson
(74) *Attorney, Agent, or Firm*—Posz & Bethards, PLC

(57) ABSTRACT

A diaphragm that distorts according to pressure applied thereon and a signal processor circuit are formed on a semiconductor substrate having an (110)-surface-orientation. Stain gauges converting the diaphragm distortion into an electric signal and forming a bridge circuit are formed on the diaphragm. The electric signal from the bridge circuit is processed by the signal processor circuit. A pair of transistors constituting an input circuit of an amplifier in the signal processor circuit are positioned on the substrate to equalize their source-drain current directions. Thermal stress influence on the sensor outputs is minimized since sensor components are formed on the substrate having the (110)-surface orientation, and thereby the pressure applied to the diaphragm is accurately detected.

10 Claims, 7 Drawing Sheets

PRESSURE TO BE DETECTED

SEMICONDUCTOR PRESSURE SENSOR HAVING SIGNAL PROCESSOR CIRCUIT

CROSS-REFERENCE TO RELATED APPLICATION

This application is based upon and claims benefit of priority of Japanese Patent Application No. 2000-328971 filed on Oct. 27, 2000, the content of which is incorporated herein by reference.

BACKGROUND OF THE INVENTION

1. Field of the Invention

The present invention relates to a pressure sensor formed on a semiconductor substrate together with a circuit for processing signals from the pressure sensor.

2. Description of Related Art

Generally, in a semiconductor pressure sensor, it is necessary to calibrate its output errors caused by a manufacturing process fluctuation or other factors. The calibration is performed in a signal processor circuit connected to a detector element. An example of the output signal calibration is disclosed in an article entitled "DSP-BASED CMOS MONOLITHIC PRESSURE SENSOR FOR HIGH VOLUME MANUFACTURING" on page 362–365 of "Transducers '99, Jun. 7–10, 1999, Sendai, Japan." This article teaches digital calibration of sensor outputs and storage of an amount of calibration in a non-volatile on-chip memory.

It is known to use CMOS elements in a signal processor circuit for a semiconductor pressure sensor, as disclosed in JP-A-8-64693 and JP-A-7-326771. The CMOS elements are usually formed on a silicon substrate having an (100)-surface-orientation, which has a low boundary energy level (hereinafter referred to as an (100)-type substrate), as taught in a book "Semiconductor Device—Basic Theory and Process Technology" (first published in 1987 and issued as the sixth edition in 1992, on page 205). It is generally known to make a semiconductor sensor compact by forming the signal processor circuit that includes CMOS elements on a chip together with the sensor element.

On the other hand, JP-A-4-119672 suggests that the pressure sensor formed on the (100)-type substrate has a problem in accuracy, because an offset voltage is generated by thermal stress on a diaphragm and temperature dependency of the offset voltage is non-linear. It also suggests the offset voltage due to thermal stress may be reduced by using a silicon semiconductor substrate having an (110)-surface-orientation in making a discrete type pressure sensor.

However, there still remains a problem of output errors in a semiconductor pressure sensor, notwithstanding various suggestions made in prior art.

SUMMARY OF THE INVENTION

The present invention has been made in view of the above-mentioned problem, and an object of the present invention is to provide an improved semiconductor pressure sensor having high detection accuracy by minimizing an adverse influence of the thermal stress on the sensor output voltage.

The semiconductor pressure sensor according to the present invention is composed of a pressure detector element and a signal processor circuit, both formed on a semiconductor substrate having an (110)-surface-orientation (referred to as an (110)-type substrate). The pressure detector element includes a diaphragm and four strain gauges formed on the diaphragm. The diaphragm is distorted in response to a pressure imposed thereon, and the diaphragm distortion is converted into an electric signal by the strain gauges. The strain gauges formed as a diffusion layer on the substrate are connected to form a Wheatstone bridge. A constant voltage is supplied to the bridge as an input voltage, and the bridge outputs a signal voltage representing the pressure to be measured.

The signal processor circuit for processing the output voltage from the detector element includes CMOS elements or Bi-CMOS elements. The signal processor circuit has an amplifier for amplifying the output voltage from the detector element. The output voltage is inputted to the amplifier from its input circuit composed of a pair of transistors. The pair of transistors are positioned on the substrate so that current between a source and a drain in both transistors flows in the same direction.

Preferably, the strain gauges are positioned on the (110)-type substrate along its <110> crystal axis, and the pair of transistors in the amplifier input circuit are positioned so that the source-drain current flows in the direction of the <110> crystal axis. The diaphragm is formed in an octagonal shape to equalize thermal stress influence on each strain gauge. The signal processor circuit includes a non-volatile memory in which data for adjusting the detector output voltage are written from outside.

Since the pressure detector element and the signal processor circuit are formed on the (110)-type substrate, the influence of thermal stress on the sensor outputs is reduced, and thereby the pressure is detected with high accuracy. Since the pair of transistors in the amplifier input circuit are positioned on the substrate to equalize the source-drain current directions, the amplifier is able to amplify a low level detector output voltage with high accuracy. Temperature dependency of the sensor output voltage, which possibly exists at a low level, is easily adjusted based on the data in the non-volatile memory.

Other objects and features of the present invention will become more readily apparent from a better understanding of the preferred embodiment described below with reference to the following drawings.

DETAILED DESCRIPTION OF THE PREFERRED EMBODIMENT

First, with reference to FIGS. 6A–6B and 7A–7C, a general concept of the present invention will be explained. The thermal stress influence on the sensor output voltages in a diaphragm sensor formed on the semiconductor substrate having (100)-surface-orientation (hereinafter referred to as the (100)-type substrate) and in a diaphragm sensor formed on the semiconductor substrate having (110)-surface orientation (hereinafter referred to as the (110)-type substrate) is investigated.

Figure 6A:
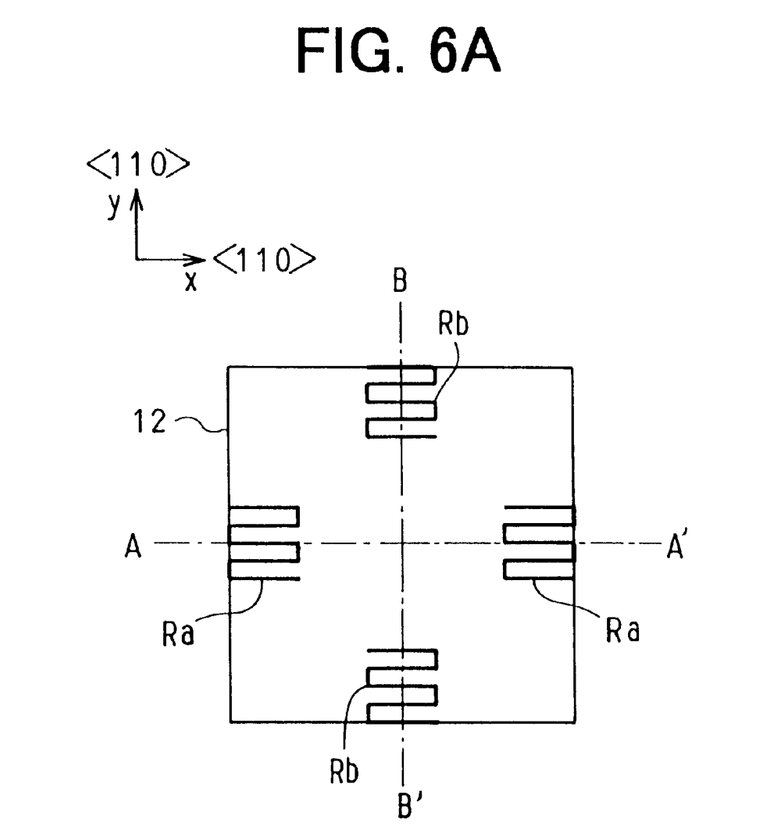
FIG. 6A is a schematic plan view showing positions of strain gauges formed on an (100)-type substrate.
Figure 6B:
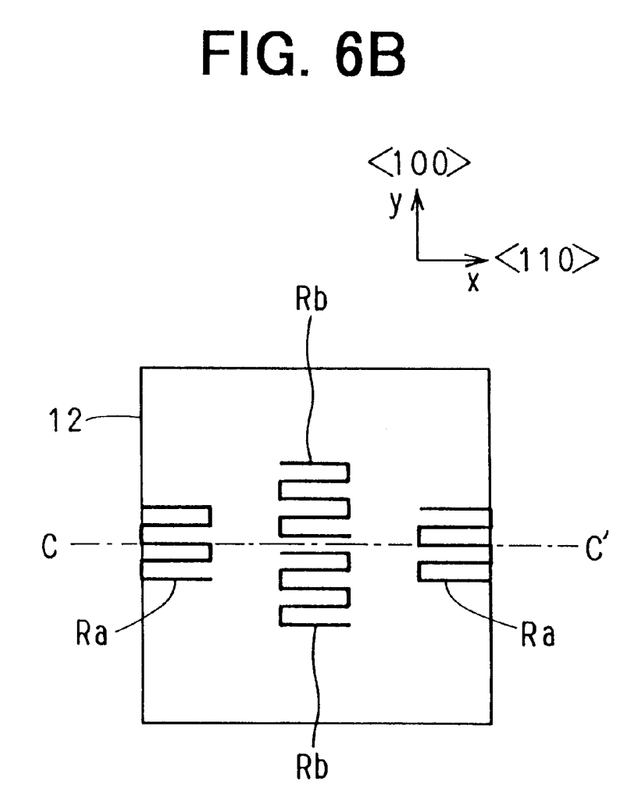
FIG. 6B is a schematic plan view showing positions of strain gauges formed on an (110)-type substrate.

FIGS. 6A and 6B show positions of strain gauges Ra, Rb formed on the (100)-type substrate and on the (110)-type substrate, respectively. The strain gauges Ra, Rb are formed on a square diaphragm 12. A line A–A' in FIG. 6A and a line C–C' in FIG. 6B denote x-direction, respectively. A line B–B' in FIG. 6A denotes y-direction which is perpendicular to x-direction. Crystal axes <110> of the (100)-type substrate lie in both the x-direction and the y-direction, as shown in FIG. 6A. A pair of strain gauges Ra are positioned along the x-direction, and another pair of strain gauges Rb are positioned along the y-direction. On the other hand, in the (110)-type substrate, a crystal axis <110> lies in the x-direction while a crystal axis <100> lies in the y-direction, as shown in FIG. 6B. All of the strain gauges Ra, Rb are positioned along the x-direction, because x-direction sensitivity is much higher than y-direction sensitivity in the (110)-type substrate.

In both the (100)-type and (110)-type substrates, a bridge circuit is formed by a pair of strain gauges Ra and a pair of strain gauges Rb. In the (100)-type substrate, a resistance change $\Delta R$ in each gauge resistance R and a gauge output voltage $\Delta V$ as a sensor output are expressed in the following formulae, where a direction of current I flowing in each gauge Ra, Rb is x, an x direction component of imposed stress is $\sigma x$, y direction component of imposed stress is $\sigma y$, a coefficient of piezoelectric resistance is $\pi 44$, a resistance change in Ra is $\Delta Ra$, and a resistance change in Rb is $\Delta Rb$:

$$\Delta R = (½) \cdot R \cdot (\sigma x - \sigma y) \cdot \pi 44$$

$$\Delta V = (½) \cdot (\Delta Ra - \Delta Rb) \cdot I$$

In the (110)-type substrate, $\Delta R$ and $\Delta V$ are expressed in the following formulae:

$$\Delta R = (½) \cdot R \cdot \sigma x \cdot \pi 44$$

$$\Delta V = (½) \cdot (\Delta Ra - \Delta Rb) \cdot I$$

Distributions of the thermal stress will be discussed with reference to FIGS. 7A, 7B and 7C. The thermal stress in x-direction of the (100)-type substrate is shown in FIG. 7A, the thermal stress in y-direction of the (100)-type substrate is shown in FIG. 7B, and the thermal stress in x-direction of the (110)-type substrate is shown in FIG. 7C.

Figure 7A:
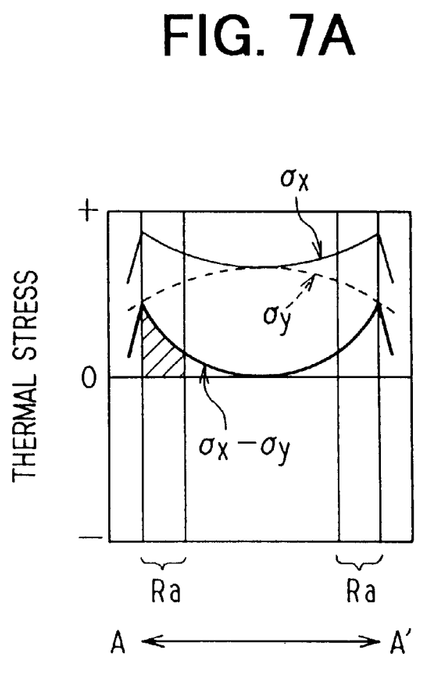
FIG. 7A is a chart showing a thermal stress distribution in x-direction on the (100)-type substrate.
Figure 7B:
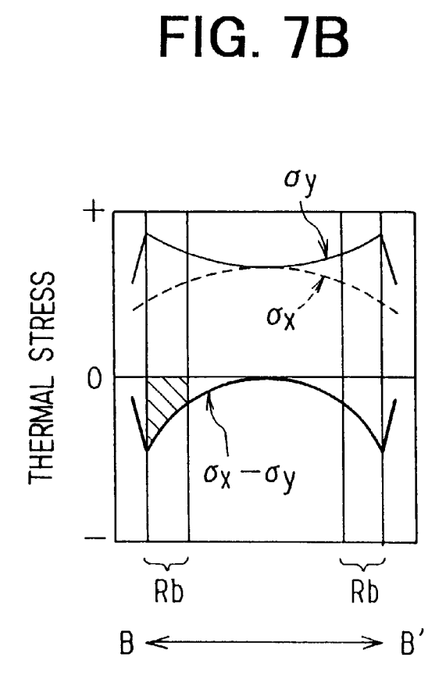
FIG. 7B is a chart showing a thermal stress distribution in y-direction on the (100)-type substrate.

As seen in FIG. 7A, the thermal stress $\sigma x$ in the x-direction of the (100)-type substrate is high at both ends of the diaphragm 12, while the thermal stress $\sigma y$ in the y-direction is high at the middle portion and low at both ends. A difference between $\sigma x$ and $\sigma y$ ($\sigma x - \sigma y$), that represents an error component of thermal stress in the gauges Ra, is a positive value. On the other hand, as seen in FIG. 7B, the thermal stress $\sigma x$ in the y-direction of the (100)-type substrate is high at the middle portion and low at both ends of the diaphragm 12, while the thermal stress $\sigma y$ in the y-direction is low at the middle portion and high at both ends. A difference between $\sigma x$ and $\sigma y$ ($\sigma x - \sigma y$), that represents an error component of thermal stress in the gauges Rb, is a negative value.

As described above, in the (100)-type substrate, the error component of thermal stress in the gauges Ra is a positive value and that in the gauges Rb is a negative value. Therefore, both error components are added in the above formula calculating the gauge output voltage $\Delta V$. This means that the error components in both gauges Ra and Rb formed on the (100)-type substrate adversely affects the gauge output voltage in a higher degree.

Figure 7C:
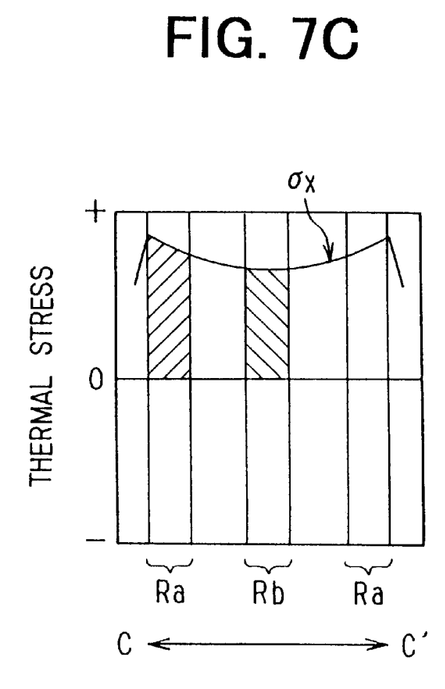
FIG. 7C is a chart showing a thermal stress distribution in x-direction on the (110)-type substrate.

In contrast, in the (110)-type substrate, the distribution of the thermal stress error component $\sigma x$ in the x-direction is substantially symmetric with respect to gauges Ra and Rb, as seen in FIG. 7C. Therefore, only a small possible difference between error components in the gauges Ra and Rb affects the gauge output voltage $\Delta V$. This means that the influence of the thermal stress on the gauge output voltage is smaller in the (110)-type substrate than in the (100)-type substrate.

In the conventional semiconductor pressure sensor, however, the (100)-type substrate has been used because its boundary charge density which is a factor of trapping impurity atoms and causes functional fluctuations in elements is the lowest among various types of substrates. It is taught in a book "Grovels Fundamentals of Semiconductor Devices" (on page 382; written by Andrew S. Grove, translated by S. Tarui, published by McGraw-Hill in 1992 as a seventh edition) that a ratio of the boundary charge density in three types of substrates is: (111): (110): (100)=3:2:1. This means that the boundary charge density of the (110)-type substrate is two times higher than that of the (100)-type substrate.

Despite of the above teaching, it is found out that the (110)-type substrate is properly usable as a substrate of the pressure sensor by using recent manufacturing processes. The semiconductor pressure sensor according to the present invention is formed on the (110)-type substrate to utilize its merit found out in the above-described investigation, i.e., the thermal stress influence on the sensor outputs is small.

Figure 1:
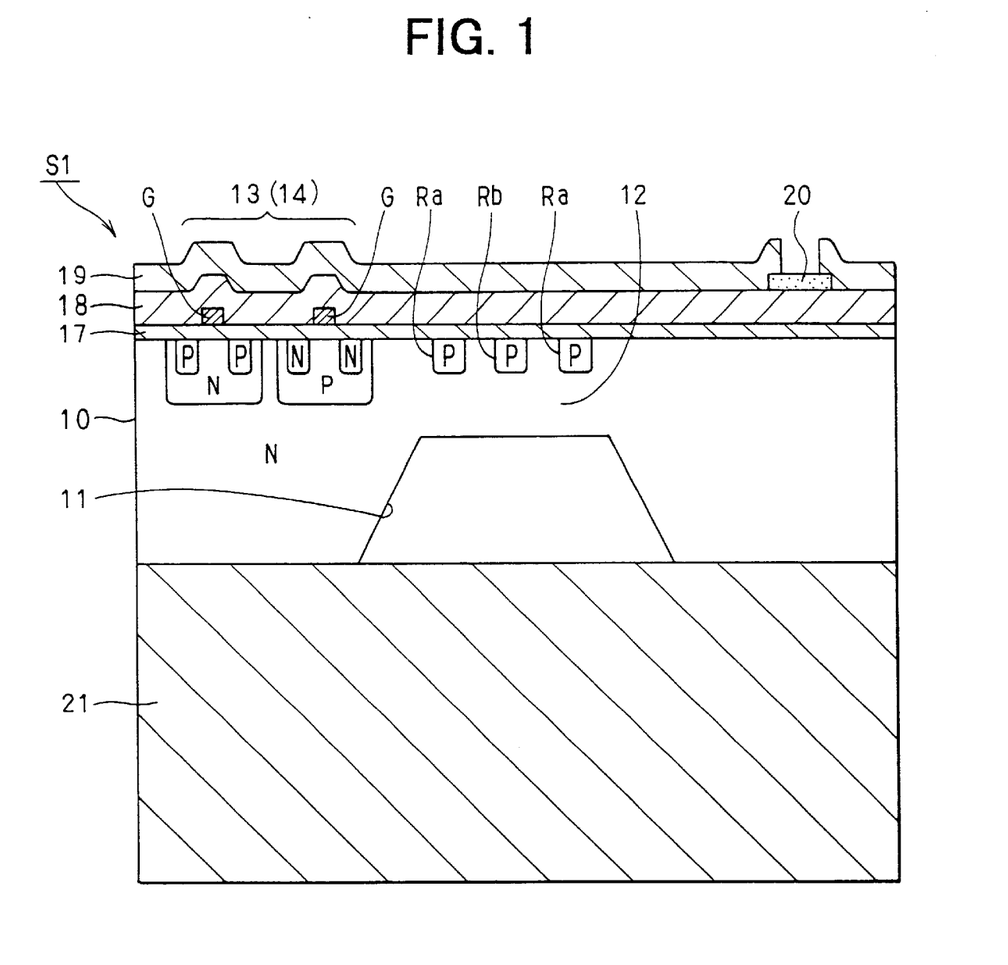
FIG. 1 is a cross-sectional view showing a structure of a semiconductor pressure sensor according to the present invention.
Figure 2:
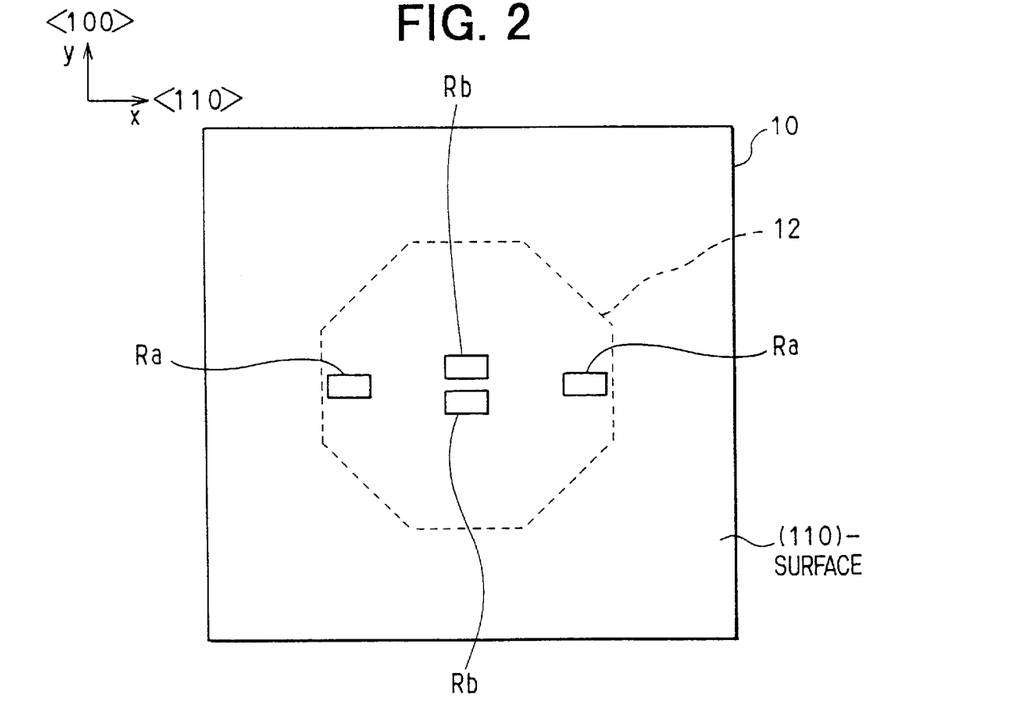
FIG. 2 is a plan view showing positions of strain gauges formed on a semiconductor substrate.

A preferred embodiment of the present invention will be described with reference to FIGS. 1–5. As shown in FIG. 1, the diaphragm-type pressure sensor S1 according to the present invention is formed on the (110)-type silicon substrate 10. The substrate 10 is an N-type semiconductor substrate made by diffusing phosphorus (P) into silicon (Si). The substrate 10 is a rectangular-shaped chip cutout from a larger substrate, as shown in FIG. 2. A cavity 11 is formed on the rear surface (the bottom side in FIG. 1) of the substrate 10 by anisotropic etching using an alkaline solution. A portion of the substrate 10 made thin by the cavity 11 serves as a diaphragm 12 which is deformed according to a pressure supplied to the front surface of the substrate 10. Strain gauges Ra, Rb which convert the diaphragm deformation into electrical signals are formed on the front surface (the top side in FIG. 1) of the substrate 10. The strain gauges Ra, Rb constitute a pressure detector element together with the diaphragm 12.

Figure 3:
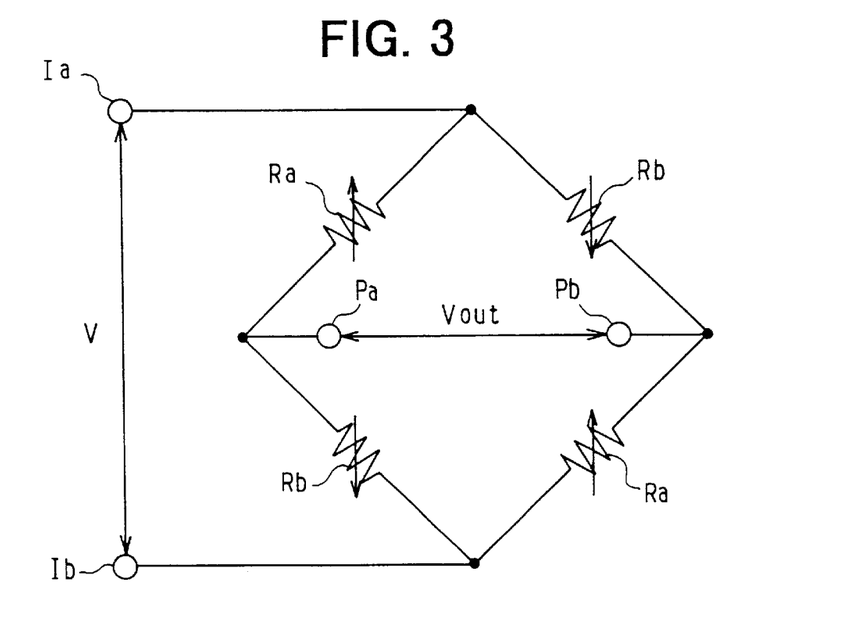
FIG. 3 is a circuit diagram showing a bridge formed by the strain gauges.

A P-type diffusion layer made by diffusing boron (B) or the like into silicon (Si) forms the strain gauges Ra, Rb. A plane shape of the diaphragm 12 is an octagon as shown in FIG. 2. This octagonal diaphragm 12 is defined by sides perpendicular to crystal axes <100>, <110> and <111>, as described in JP-A-4-119672. Strain gauges Ra, Rb are positioned relative to the crystal axes in the same manner as shown in FIG. 6B. That is, four strain gauges Ra, Rb are positioned along the crystal axis <110> having a high sensitivity, as shown in FIG. 2. The strain gauges Ra, Rb are connected to form a Wheatstone bridge as shown in FIG. 3. Each strain gauge is a resistive element, and the resistance of the gauges Ra positioned at a periphery of the diaphragm change in a different direction from that of the gauges Rb positioned at a center portion of the diaphragm 12 in response to imposed stress. as shown in FIG. 6B. That is, four strain gauges Ra, Rb are positioned along the crystal axis <110> having a high sensitivity, as shown in FIG. 2. The strain gauges Ra, Rb are connected to form a Wheatstone bridge as shown in FIG. 3. Each strain gauge is a resistive element, and the resistance of the gauges Ra positioned at a periphery of the diaphragm change in a different direction from that of the gauges Rb positioned at a center portion of the diaphragm 12 in response to imposed stress.

A direct current constant voltage V is applied between both input terminals Ia and Ib of the Wheatstone bridge, as shown in FIG. 3. The resistance of the gauges Ra, Rb changes according to an amount of distortion of the diaphragm 12 caused by the applied pressure, and a sensor output voltage Vout appears between output terminals Pa and Pb in accordance with the applied pressure.

A signal processor circuit 14 that includes CMOS transistors 13 is formed on the front surface of the substrate 10, as shown in FIG. 1. The signal processor circuit 14 feeds the constant voltage V to the Wheatstone bridge and processes (amplifies, calibrates, etc) the sensor output voltage Vout. The CMOS transistors 13 are composed of NMOS transistors or PMOS transistors. Those transistors are made by diffusing impurities such as boron, phosphorus into silicon and by forming poly-silicon gates G in a known process. Resistors and capacitors forming the signal processor circuit 14 together with the CMOS transistors 13 are also formed on the front surface of the substrate 10.

The signal processor circuit 14 also includes a nonvolatile memory such as an EPROM in which data is written from outside. The output signals from the pressure detector element are calibrated or adjusted based on the data written in the non-volatile memory. More particularly, sensitivity, offset voltage, temperature characteristics, temperature dependency of the offset voltage of the detector element and the like are calibrated or adjusted based on the data written in the non-volatile memory.

Figure 4:
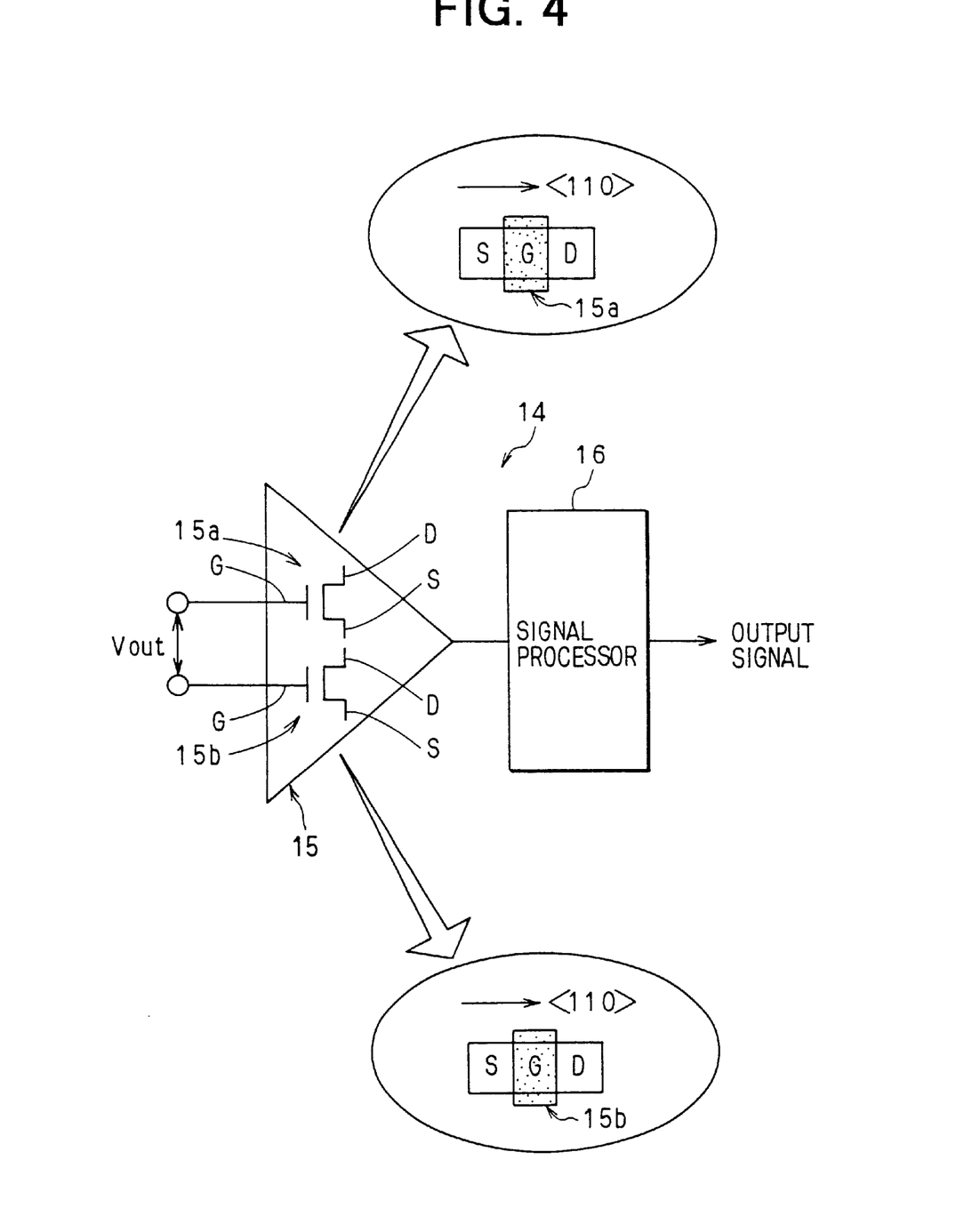
FIG. 4 is a schematic diagram showing a structure of a signal processor circuit formed on the semiconductor substrate.

As shown in FIG. 4, a pair of transistors 15a, 15b which form an input circuit to a differential amplifier 15 in the signal processor circuit 14 are positioned in a particular manner. That is, those transistors are positioned, so that respective currents flowing between respective drains D and sources S of the transistors 15a, 15b flow in the same direction. The sensor output voltage Vout fed to the differential amplifier 15 is amplified therein and then fed to a signal processor 16.

The signal processor 16 outputs a final output signal after adjusting or calibrating the sensor output voltage.

In an example of the differential amplifier 15 shown in FIG. 4, both transistors 15a and 15b forming the input circuit are N-channel transistors. Both transistors 15a, 15b are positioned on the substrate 10, so that a current direction between the source S and the drain D in each transistor becomes parallel to the crystal axis <110>. Both transistors 15a, 15b may be positioned so that the source-drain current of each transistor follows in parallel to another crystal axis <100>, as long as both directions of the source-drain current are the same. Both transistors 15a, 15b may be P-channel transistors.

Referring to FIG. 1 again, a gate oxidation layer 17 for insulating the diffusion layer of the CMOS transistors 13 from the gates G, an insulating layer 18 made of silicon dioxide for insulating various components in the processor circuit 14, and a protector layer 19 made of silicon nitride for covering the outside of the pressure sensor S1 are laminated on the front surface of the substrate 10 in this order. An opening is formed in the protector layer 19, and a pad 20 made of aluminum or the like is formed in the opening. The signal processor circuit 14 is electrically connected to an outside circuit via the pad 20 by wire-bonding. A glass substrate 21 is pasted on the rear surface of the substrate 10 to hermetically close the cavity 11 which is kept in vacuum.

Figure 5:
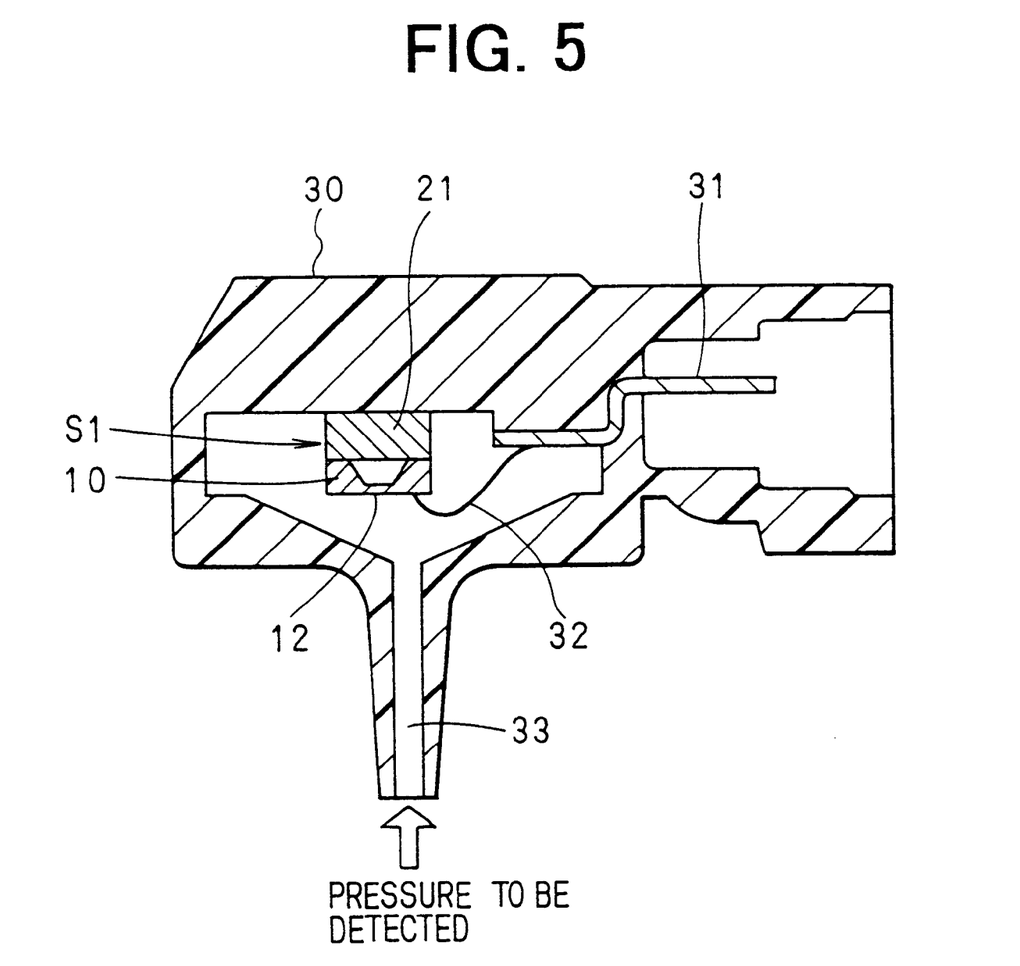
FIG. 5 is a cross-sectional view showing a sensor assembly on which the semiconductor pressure sensor is mounted.

The semiconductor pressure sensor S1 described above is manufactured using known processes. The semiconductor pressure sensor S thus manufactured is installed in a case 30, forming a sensor assembly as shown in FIG. 5. The case 30 is made of a material such as resin, and a terminal for electrically connecting the pressure sensor S1 to an outside circuit is embedded in the case 30 in a molding process. The pressure sensor S1 is pasted on an inside surface of the case 30 via the glass substrate 21. The pad 20 and the terminal 31 are electrically connected by a bonding wire 32. A pressure-introducing pipe 33 through which a pressure to be measured is introduced into the case 30 is formed integrally with the case 30. The case 30 may be separated into two portions to easily mount the pressure sensor S1 on one portion and then to connect two portions.

The pressure introduced into the sensor assembly is imposed on the diaphragm 12 of the pressure sensor S1. The diaphragm 12 is distorted by the imposed pressure, and the distortion is converted into electrical signal voltage Vout by the strain gauges Ra, Rb. The signal voltage Vout is processed in the signal processing circuit 14. The processed signal is outputted through the terminal 31 as a signal representing the detected pressure.

As described above, the pressure detector element composed of the diaphragm 12 and the strain gauges Ra, Rb is formed on the (110)-type semiconductor substrate 10 (not on the (100)-type substrate). The signal processor circuit 14 including the MOS elements 13 is also formed on the same substrate 10. That is, the pressure detector element and the signal processor circuit are integrally formed on the same (110)-type substrate. Accordingly, the semiconductor pressure sensor S1 can be made compact at low cost.

Since the (110)-type substrate is used, the thermal stress influence on the sensor output signal is considerably lower than that of the conventional sensor using the (100)-type substrate. Therefore, the detection errors due to the thermal stress are small, and the sensor output signals are easily adjusted or calibrated in the signal processor circuit 14. More particularly, the influence of the thermal stress appears as a temperature dependency of the offset voltage. Suppressing the thermal stress influence results in reducing the temperature dependency of the offset voltage. Accordingly, an amount of output adjustment required is small in the pressure sensor of the present invention.

Further, a non-linearity of an offset voltage relative to temperature (a secondary component of the temperature dependency) is also considerably reduced in the pressure sensor according to the present invention, compared with that of the conventional pressure sensor. It is not necessary, therefore, to calibrate the non-linearity. If such calibration is required, the signal processor circuit 14 has to be sophisticated. In the pressure sensor of the present invention, accurate sensor outputs are realized only by adjusting a small temperature dependency (a primary component) of the offset voltage.

Moreover, by making the shape of the diaphragm 12 in an octagon defined by sides perpendicular to crystal axes <100>, <110> and <111>, and by optimizing a ratio among the octagon sides as suggested in above-mentioned JP-A-4-119672, the thermal stress influence can be further reduced and minimized. By changing the shape of the diaphragm 12 to the octagon from a usual rectangular shape, the thermal stress distribution curve shown in FIG. 7C can be further flattened. Accordingly, a thermal stress difference between two strain gauges Ra and Rb is made smaller, and the thermal stress influence can be reduced.

The input circuit of the differential amplifier 15 shown in FIG. 4 is composed of a pair of transistors 15a, 15b, and both transistors 15a, 15b are positioned so that the source-drain current in both transistors flow in the same direction. The reason for positioning both transistors 15a, 15b in this manner will be explained below. The output signal voltage from the strain gauges has to be amplified because its level is very low. The differential amplifier 15 must have a high accuracy to amplify the very low level voltage.

Figure 8A:
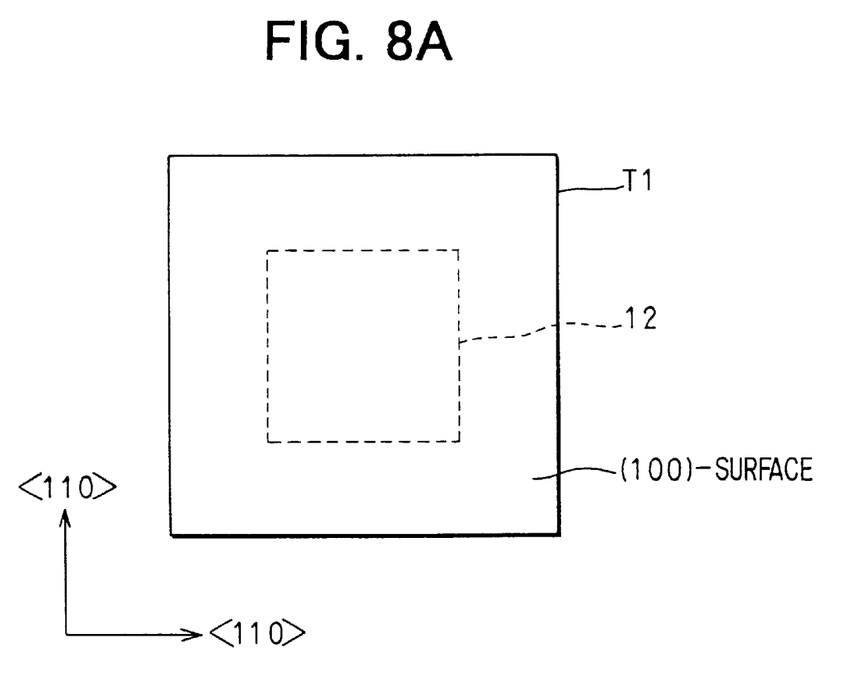
FIGS. 8A and 8B are schematic drawings showing crystal axis directions on the (100)-type substrate.
Figure 8B:
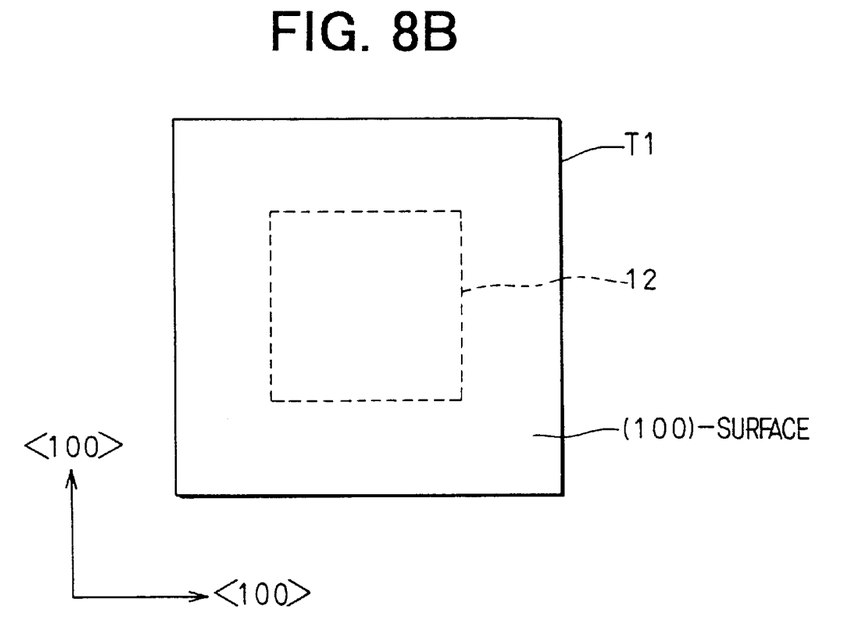

If a semiconductor chip Ti is cut from a (100)-type wafer along its <110> crystal axis, as shown in FIG. 8A, the crystal axis directions along both sides become equally parallel to the <110> axis. In this case, the transistors can be positioned on this chip Ti either along the x-side or along the y-side without causing a crystal axis direction difference between both transistors 15a, 15b. The same applies to a chip Ti which is cutout from the (100)-type wafer along its crystal axis <100>, as shown in FIG. 8A. However, the semiconductor chip used in the above embodiment is cutout from the (110)-type wafer so that the x-side crystal axis direction becomes parallel to the <110> axis and the y-side crystal axis direction becomes parallel to the <100> axis, as shown in FIG. 2. In other words, the crystal axes in x- and y-directions are not equal in this case. The coefficient of the piezoelectric resistance differs depending on the direction of crystal axes. Therefore, if both transistors 15a, 15b are positioned on the chip in different directions relative to the crystal axis, matching of a pair of transistors is not secured. If the matching of the pair of transistors constituting the input circuit of the amplifier 15 is not secured, sensor output errors (the offset voltage) increase. To secure a good matching of the pair of transistors 15a, 15b, in the embodiment of the present invention, they are positioned so that the current directions between the source S and the drain D of both transistors become the same with respect to the crystal axis. In this manner, the amplifier 15 amplifies a low level signal with a high accuracy.

Further, according to the present invention, the non-volatile memory is included in the signal processor circuit 14. Data for adjusting the sensor signals can be written in the non-volatile memory from outside even after the sensor assembly is completed. Accordingly, sensor signal errors due to manufacturing process fluctuation can be easily adjusted based on the data written in the nonvolatile memory.

The present invention is not limited to the embodiment described above, but it may be variously modified. For example, the signal processor circuit 14 may be composed of a Bi-CMOS circuit that includes bipolar transistors and CMOS transistors.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A semiconductor pressure sensor comprising:
   a semiconductor substrate having a (110)-surface-orientation and including a <100> crystal axis and a <110> crystal axis that is orthogonal to the <100> crystal axis;
   a pressure detector element formed on the semiconductor substrate, the pressure detector element outputting an electric signal according to a pressure imposed thereon; and
   a signal processor circuit including CMOS elements, formed on the semiconductor substrate, for processing the electric signal outputted from the pressure detector element, the signal processor circuit including an amplifier circuit having an input circuit composed of a pair of transistors from which the electric signal outputted from the pressure detector element is inputted to the amplifier circuit, wherein the pair of transistors is positioned on the semiconductor substrate so that currents between respective sources and drains thereof flow in a same direction.

2. The semiconductor pressure sensor as in claim 1, wherein:
   the pressure detector element includes a diaphragm which is distorted in response to the pressure imposed thereon and strain gauges formed on the diaphragm as a diffusion layer, the strain gauges converting the diaphragm distortion into the electric signal.

3. The semiconductor pressure sensor as in claim 2, wherein:
   the diaphragm has an octagonal plane shape.

4. The semiconductor pressure sensor as in claim 1, wherein:
   the signal processor circuit includes Bi-CMOS circuits.

5. The semiconductor pressure sensor as in claim 1, wherein:
   the signal processor circuit includes a non-volatile memory in which data are written from outside, and the electrical signal outputted from the pressure detector element is adjusted based on the data written in the non-volatile memory.

6. The semiconductor pressure sensor as in claim 1, wherein:
   the pair of transistors constituting the input circuit of the amplifier are positioned on the semiconductor substrate so that current between a source and a drain of both transistors flows in a direction parallel to an <110> crystal axis of the semiconductor substrate.

7. The semiconductor pressure sensor as in claim 1, wherein the pair of transistors N composing the input circuit of the amplifier are positioned on the semiconductor substrate so that respective currents between respective sources and drains of the pair of transistors flow in an identical direction, the identical direction being parallel to a crystal axis of the semiconductor substrate.

8. The semiconductor pressure sensor as in claim 7, wherein the crystal axis of the semiconductor substrate comprises a <110> crystal axis.

9. The semiconductor pressure sensor of claim 1, wherein the pair of transistors is positioned on the semiconductor substrate so that the currents between the respective sources and drains thereof flow in a <110> crystal axis direction of the semiconductor substrate.

10. A semiconductor pressure sensor comprising:
    a semiconductor substrate having a (110) surface orientation;

a pressure detector formed on the semiconductor substrate for outputting detection signals corresponding to a detected pressure; and a signal processor including CMOS elements formed on the semiconductor substrate for processing the detection signals output from the pressure detector, the signal processor including an amplifier having a pair of transistors through which the detection signals output from the pressure detector are input, the pair of transistors being positioned on the semiconductor substrate so that respective currents flowing between respective sources and drains of the pair of transistors flow in a <110> crystal axis direction of the semiconductor substrate.

* * * * *